(12) United States Patent
Hammer et al.

(10) Patent No.: US 6,343,811 B1
(45) Date of Patent: Feb. 5, 2002

(54) INFLATABLE ROLLOVER CUSHION SYSTEM

(75) Inventors: David R. Hammer, Glendale; Deborah Lee Kalisz, Phoenix, both of AZ (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/579,939

(22) Filed: May 26, 2000

(51) Int. Cl.⁷ .............................................. B60R 21/22
(52) U.S. Cl. .................................. 280/730.2; 280/743.1
(58) Field of Search ............................ 280/730.2, 743.1

(56) References Cited

U.S. PATENT DOCUMENTS

| | | | |
|---|---|---|---|
| 5,588,672 A | 12/1996 | Karlow et al. | 280/730.2 |
| 5,788,270 A | 8/1998 | Haland et al. | 280/729 |
| 5,884,937 A | * 3/1999 | Yamada | 280/730.2 |
| 5,899,491 A | * 5/1999 | Tschaeschke | 280/730.2 |
| 6,010,149 A | * 1/2000 | Riedel et al. | 280/730.2 |

OTHER PUBLICATIONS

Photograp found in Wards Automotive News in Jan. 2000 entitled "Safer sport–utes".

* cited by examiner

*Primary Examiner*—Kenneth R. Rice
(74) *Attorney, Agent, or Firm*—Jerry J. Holden

(57) ABSTRACT

A rollover cushion and system for a motor vehicle is fabricated from a lightweight, low denier material having its inside surface coated with a gas retention material. A gas generator responsive to a sensor generates an inflation fluid that fills the sealed curtain causing the curtain to deploy over the side windows of the vehicle. In this position, the head and upper torso of an occupant are protected from striking or going through an open window during a rollover or side impact collision. Several styles of tethers are used to maintain the desired shape of the cushion. A manifold system directs the flow of the inflation fluid from the gas generator to the gas inlets in each individual cylindrical tube of the curtain. The cushion is folded either in a "Z" fold or in a tuck fold and at one end fastened to the structure of the vehicle and at the other end extending in a direction down the window. A pair of curtain tethers secured to the cushion and to the pillars maintain the cushion taut when inflated.

47 Claims, 6 Drawing Sheets

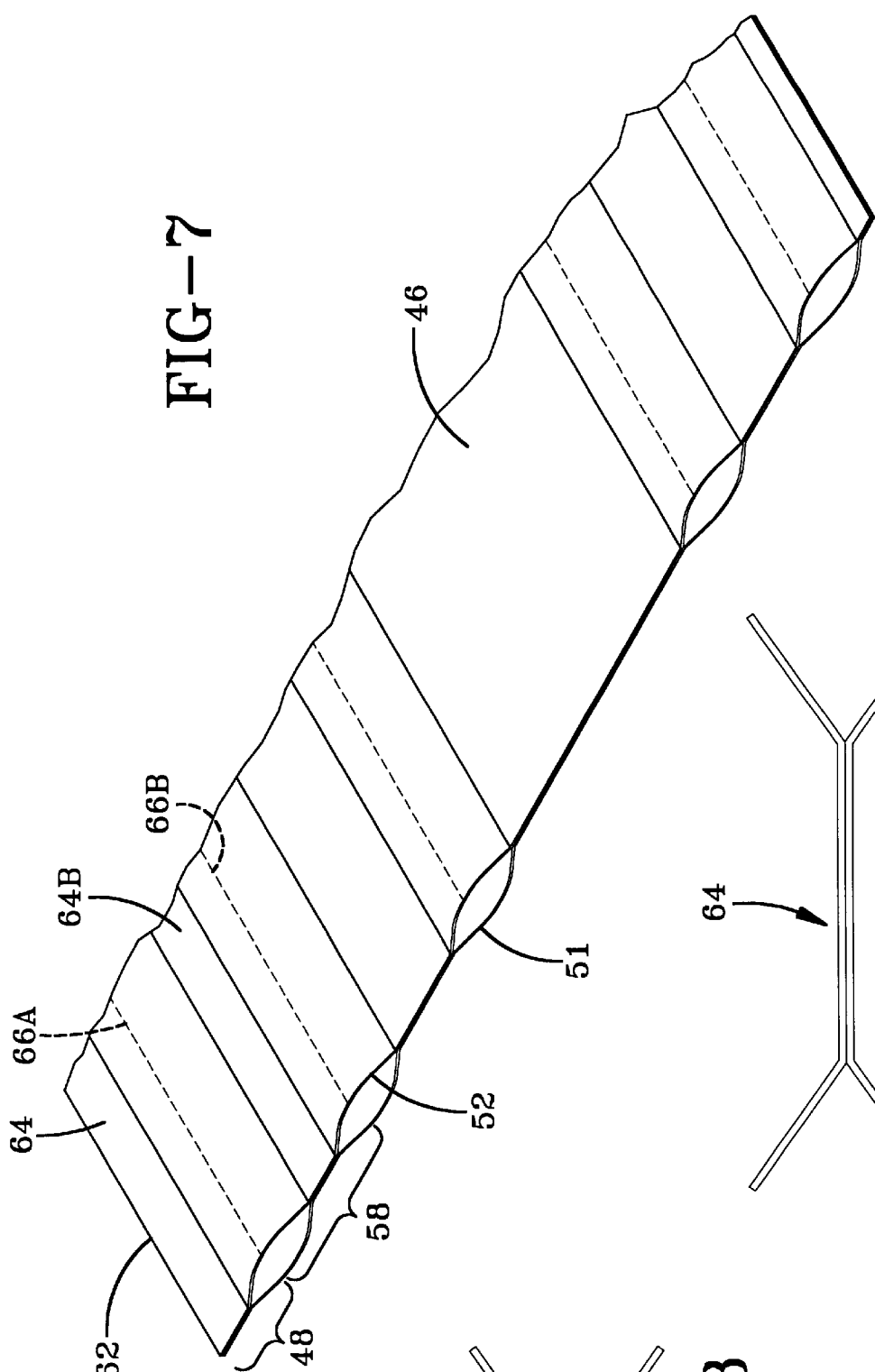

INFLATABLE ROLLOVER CUSHION SYSTEM

BACKGROUND OF THE INVENTION

1. Field of the Invention

An inflatable vehicular occupant safety restraint system in general and more particularly an inflatable rollover cushion for motor vehicles prone to rollover situations.

2. Description of the Related Art

U.S. Pat. No. 5,588,672 issued on Dec. 31, 1996 to Karlow et al and entitled "Side Impact Head Restraint With Inflatable Deployment" shows a side curtain that is attached to the roof rail and has a slide that slides down the "B" pillar. When the system is to be deployed, a gas generator generates gas to inflate the curtain. As the gas fills the curtain, a slide moves along a track on the "B" pillar to a position immediately below the centerline of the side glass. This is the only movable point in the curtain because along the roof rail the curtain is secured. When the slide comes to the end of track, it locks in place securing the curtain along the "B" pillar. Depending upon the shape of the curtain, the curtain will extend from the end of the track to a fixed point along the roof rail above the door. An occupant's head will strike the curtain that absorbs the head impact either by rebounding the head or giving way toward the glass.

U.S. Pat. No. 5,788,270 issued on Aug. 4, 1998 to HÅland and entitled "Side Impact and Roll Over Inflatable Head Protector" describes an elongated curtain that has a slide that moves along a track on the "B" pillar. The curtain has a plurality of equally spaced inflatable tubes, that when inflated extend from the roofline to a position intermediate the height of the glass. An occupant's head will strike the inflated curtain and be prevented from going through or out the window. The curtain in this embodiment has a web or a sheet that is not inflated, but rides with an inflatable portion as it is being inflated. The web extends from a point intermediate the length of the window to the "A" pillar so that only the rearward portion of the curtain is inflated. Several different size configurations are illustrated wherein each configurations extends from the roof rail to a point intermediate the height of the window.

At lest one major American car manufacturer has shown, at the Year 2000 International Auto Show in Detroit, Michigan, a mock-up of a potential side airbag curtain for some of its sport utility vehicles. The curtain extends from a position near the "A" pillar to a point adaptable to restrain the head of a rear passenger. Another American Car manufacturer has an article on page in the Automotive News, May 15, 2000, that it will install head curtain airbags manufactured by Autoliv Inc. on its 2001 cars.

SUMMARY OF THE INVENTION

It is a principal advantage is to manufacture a curtain from a lightweight material that is coated on the inside to retain the inflatable fluid.

It is yet another advantage to have a material that when formed into a gas-filled curtain will require less gas than similar curtains of substantially the same size because the material has less permeability.

It is still yet another advantage to provide a curtain that has a plurality of inflatable tubes extending either longitudinal or parallel to the upper door panel of the vehicle.

These and other advantages will become apparent from the inflatable rollover cushion for motor vehicles having a bag member formed from a single piece of lightweight material. The material is folded over and sealed along the mating open edges forming an enclosed member. Along each open seam is a "Y" shaped tether member joining the bag edges together. The "Y" shaped tether has displaceable upper arms joined together along a trunk. One open edge of the enclosed member lies along the upper arm of the "Y" and along one side of the trunk and the other open edge lies along the other upper arm of the "Y" and along the other side of the trunk. A bonding is used to secure the mating open edges along the "Y" shaped tether member forming an enclosed member forming an elongated cylindrical member. An opening at one end of the bag member is adapted to receive inflation fluid for inflating the bag member. The inside surface of the folded bag member is coated with a gas retention material.

BRIEF DESCRIPTION OF THE DRAWINGS

In the drawings:

FIG. 7 is an isometric view of a "Y" shaped tether sheet as manufactured prior to the operation of slitting;

FIG. 8 is a "Y" tether;

FIG. 9 is a double "Y" tether;

DETAILED DESCRIPTION OF THE PREFERRED EMBODIMENT

Figure 1:
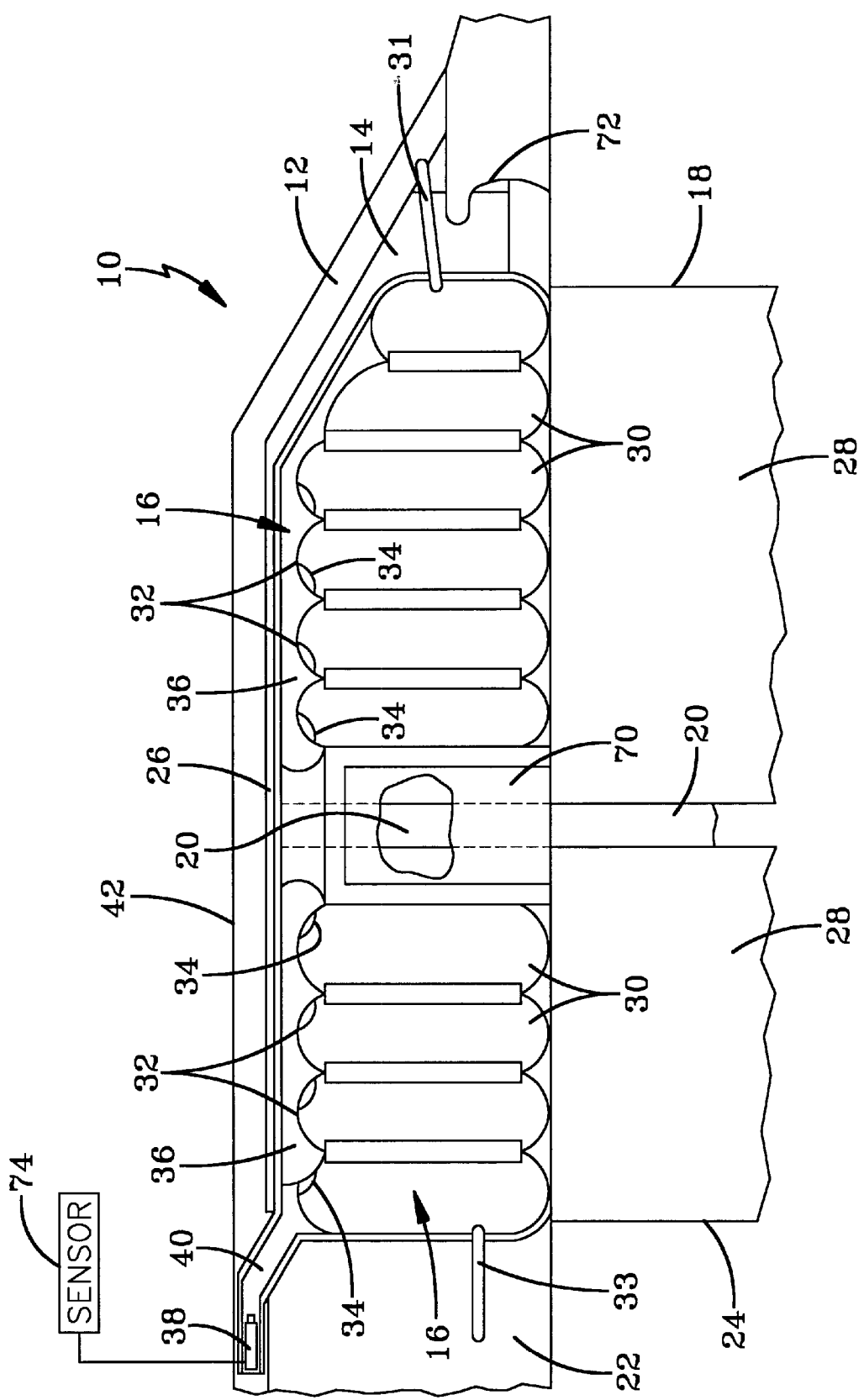
FIG. 1 is a view of the left had side of a motor vehicle from the inside having an inflated cushion with a section exposed showing the "B" pillar.

Referring to figures by the characters of reference there is illustrated in FIG. 1 an inflatable rollover cushion for motor vehicles. The view is from the inside of the motor vehicle 10 looking at the left side of the vehicle. From right to left in FIG. 1 there is illustrated the windshield 12 of the vehicle 10 and the adjacent "A" pillar 14. The inflated rollover cushion or curtain 16 is illustrated as covering the front door 18 and extending past the "C" pillar 20 to the "C" pillar 22 covering the windows 23 of both the front door 18 and the back door 24. The rollover cushion 16 extends from the roof rail 26 to below the window 23, hidden by the cushion, and along the door panels 28.

In this embodiment, the inflated cylindrical tubes 30 of the curtain 16 extend in a direction that is normal to door panels 28. The curtain has a plurality of cylindrical tubes 30 that are of a size and length as indicated by the designer of the curtain or cushion 16. The smaller the cross-sectional area of the tubes 30, the more tubes are needed to cover a given area.

The larger the cross-sectional area of the tubes 30 will decrease the travel of the occupant's head, not shown, during a side-impact or rollover of the vehicle 10. A first curtain tether 31 is attached to the curtain 16 and to the "A" pillar 14. A second curtain tether 33 is attached to the curtain and to the "C" pillar 22 to keep the curtain 16 taut against the windows 23.

The upper ends 32 of the cylindrical tubes, that is the ends nearest the roof rail 26, each have an inlet 34 that along with a passageway 36 forms a manifold system 37. The manifold system 37 conducts the inflation fluid from the gas generator 38 to each tube 30. The gas generator 38 can be positioned substantially any place in the vehicle 10 and has tubes 40 extending from the gas generator 38 to the passageway 36 in the manifold system for conducting the inflation fluid. Typically, the gas generator 38 will be placed in the roof 42 of the vehicle 10 very close to the curtain 16.

Figures 12, 13:
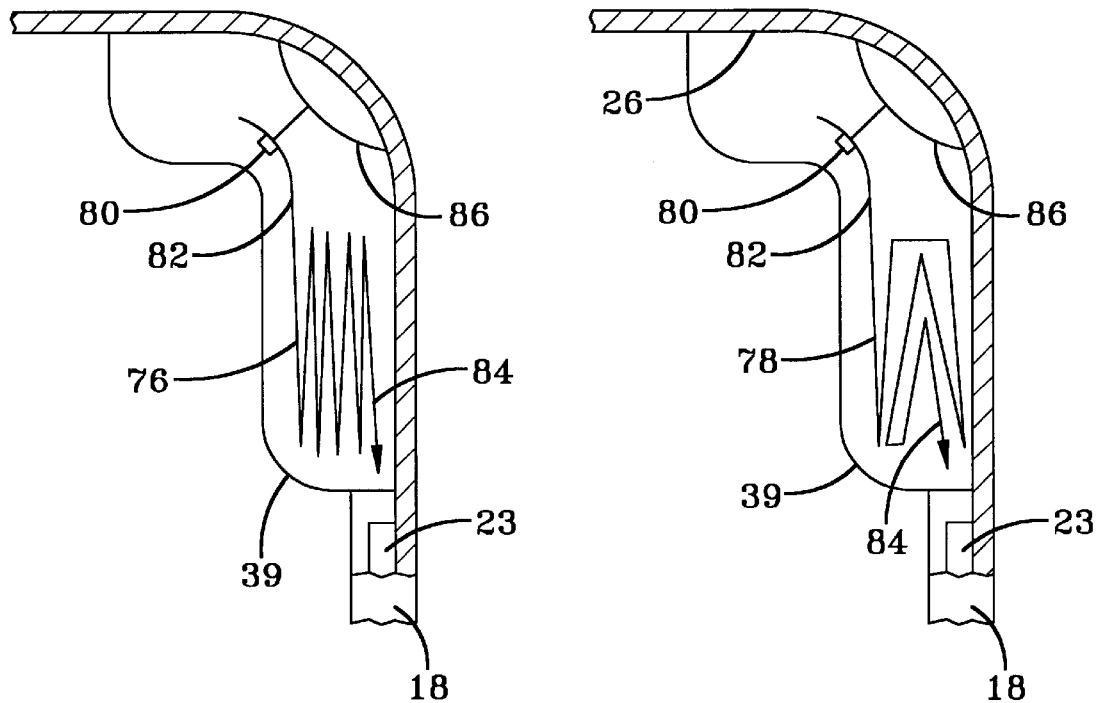
FIG. 12 is a sectional view taken across the curtain folded in the roof rail above the door prior to inflating illustrating a folding pattern for the cushion.
FIG. 13 is a sectional view similar to FIG. 12 illustrating another folding pattern for the cushion.

In the normal position, the curtain 16 is rolled or folded in a space along the roof rail 26 and is concealed by the interior headliner 39 material of the vehicle 10, as illustrated in FIGS. 12 and 13. The inflation gas has sufficient pressure along with the design of the curtain container to cause the curtain 16 to break through the headliner 39 material and deploy. A sensor 74 is positioned in or around the vehicle 10 in such an orientation that is sensitive to any roll or yaw moments on the vehicle 10. The sensor 74 sends a signal to the gas generator 38 to initiate "firing" of the gas generator. The gas generator 38 generates a gas that flows through the tubes 40 to the manifold system 37 and then through the inlet 34 into each cylindrical tube 30. The gas generator 38 generates a gas pressure that is less than twenty-five psig, 170 Kpa, and the curtain or cushion 16 inflates and deploys in less than twenty-five milliseconds. This causes the tubes 30 to unwind, burst through the headliner 39 and extend down along the glass of the doors 18, 24. By proper design of the manifold system 37, all of the cylindrical tubes 30 fill substantially at the same time. As each tube 30 elongates, it tends to "pull" the adjacent tubes 30 down as well as having the gas drive them down along the windows 23 of the doors 18, 24.

One embodiment of the cushion 16 is fabricated from a single panel of lightweight, low denier material 44. One side 45 of the material 44 is coated with a gas retention material 46 for keeping the cushion 16 inflated for a desired period. The coated material 46 is a low permeability material and therefore the cushion 16 requires less gas than a higher permeability material that allows the gas to quickly escape through the material 44. The inflation time is long enough so that cushions 16 stay inflated to protect the occupant, but short enough so that the cushion 16 is deflated quickly to allow the occupant to leave the vehicle 10.

In one embodiment of the cushion 16, the denier of the material 44 is not greater than 420 but, material 44 having denier not greater than 210 is contemplated. This lightweight material 44 reduces the overall weight of the curtain 16 in its rolled or folded position and reduces the storage volume necessary to retain the curtain 16.

Typically, the curtain 16 is "Z" folded when it is stored behind the headliner 39. The first curtain tether 31 is attached at one end to the last folded panel and the other end is positioned down along the "A" pillar. The second curtain tether 33 is attached at one end to the last folded panel and the other end is positioned down along the "C" pillar 22.

Figure 2:
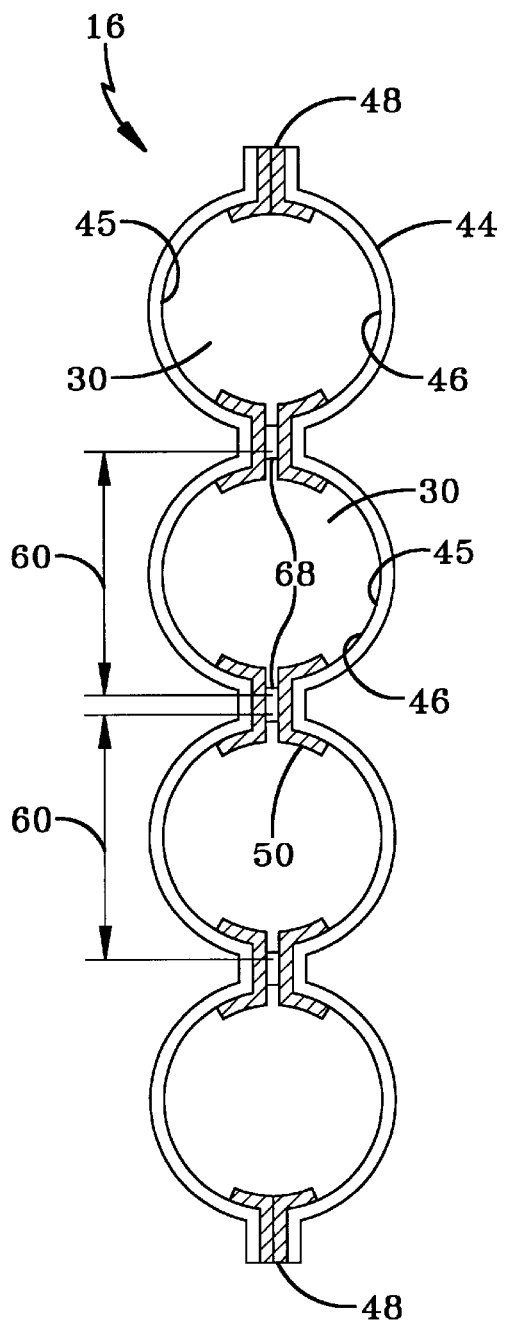
FIG. 2 is a partial cross-sectional view of one embodiment of joining the sections of an inflated cushion.
Figure 3:
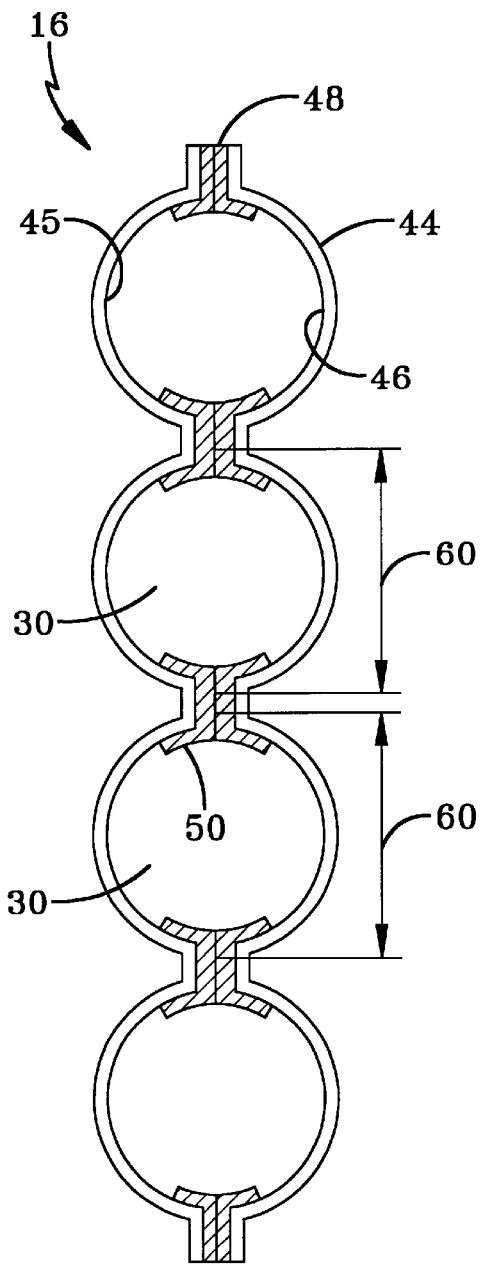
FIG. 3 is a partial cross-sectional view of another embodiment of joining the sections of an inflated cushion.

The "Y" shaped tether 48 is illustrated in FIG. 8. This tether 48 is typically used around the edges of the curtain 16 to form an enclosed bag as illustrated in section in FIGS. 2 and 3. The bag is enclosed with the sole exception that the manifold system 37 has an inlet 34 for receiving the inflation fluid from the gas generator 38. In FIGS. 2 and 3, the sheet of material can be either a single sheet 44 or two 51, 52 separate sheets as hereinafter described.

Figure 4:
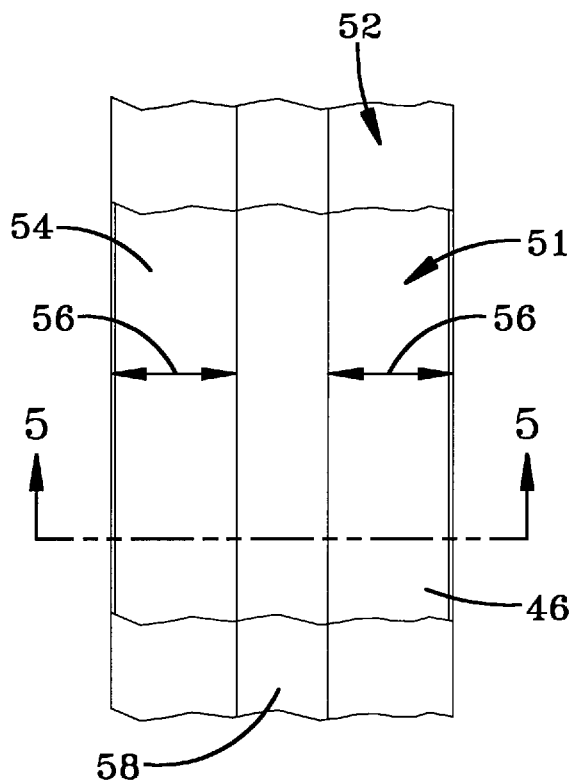
FIG. 4 is a plan view of a strip of "X" shaped tethers.
Figure 5:
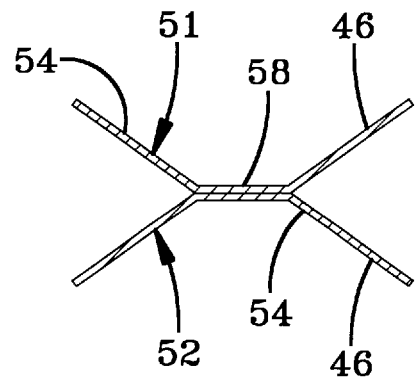
FIG. 5 is a sectional view taken along line 5—5 of FIG. 4.
Figure 6:
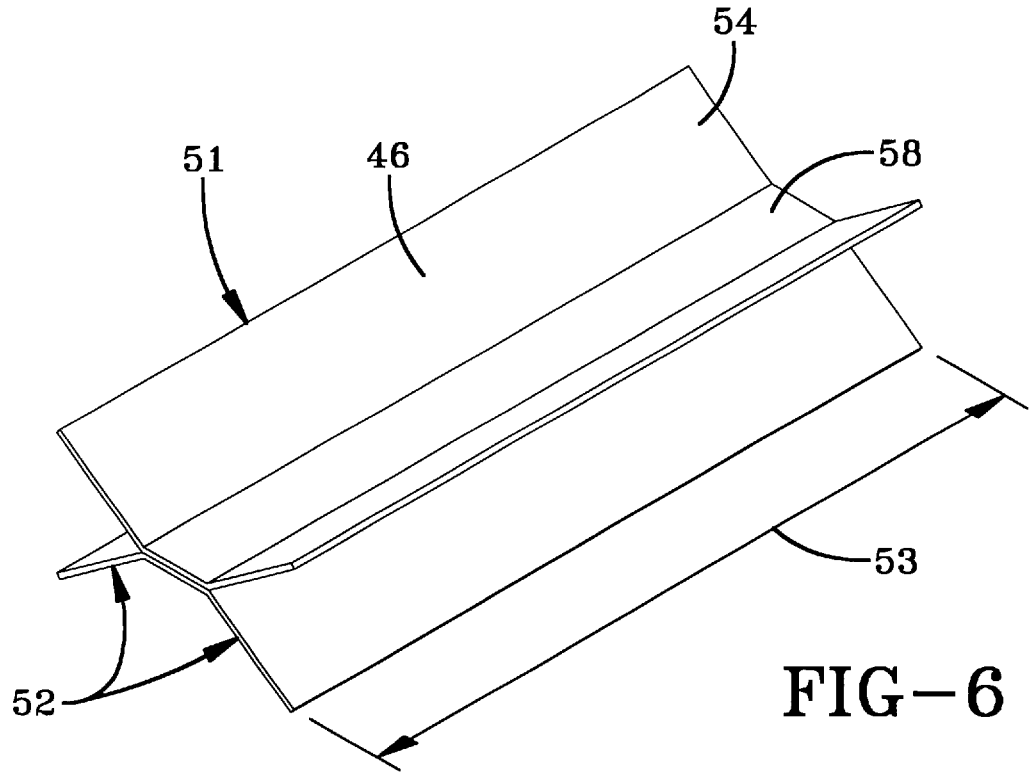
FIG. 6 is an isometric view of the tether of FIG. 4.

To make a curtain of a multiple of cylindrical tubes 30, one or more "X" shaped tethers 50 such as illustrated in FIGS. 4–6 are used. These "X" shaped tethers 50 are positioned on the inside surface 45 of the sheet 44 at the desired spacing required to have the desired number of tubes 30 for safety. In short, the number of tubes 30 and the spacing of the "X" shaped tethers 50 are a matter of design choice.

In one embodiment of the "Y" and "X" tethers 48, 50, the denier of the material 44 is not greater than 420 but material having denier not greater than 210 is contemplated.

The "X" shaped tethers 50 are formed by first having a pair of sheet members 51, 52 overlying each other forming a strip 53. The outside surfaces 54 of the sheet members 51, 52, the surfaces not adjacent to each other, are coated with the gas retention material 46. The sheet materials 51, 52 are a thermoplastic material compatible with ultrasonic or radio frequency welding. As illustrated in FIG. 4, a distance 56 from each edge is an area 58 that has a predetermined width. In this area 58 of material, the two sheets 51, 52 are bound together either by weaving, sewing or by bonding. When this process is completed, the cross-sectional view of the material is shown in FIG. 5 with an isometric view shown in FIG. 6. The strips 53 are cut to length and are typically equally placed spaced between the folded panel 44 or overlying sheets, as hereinafter described, of the curtain 16. Once in place, the curtain sheet member is then bonded to the arms of the "X" shaped tether 50.

Referring to FIG. 7, the space 60 between the "X" shaped tethers defines the size of the cylindrical tubes. The "X" shaped tethers extend the complete length of the cushion or bag so that each cylindrical tube is sealed except for the inflation fluid inlet.

The "Y" shaped tethers are formed by bonding two pieces of material together forming the trunk portion of the "Y" and having the upper arms of the "Y" free. The material is first coated on the outside with the gas retention material in the same manner as the "X" shaped tether. As stated above, the edges of the sheet member are welded or bonded to the trunk and the top sheet is bonded or welded to one arm and the bottom sheet to the other arm.

Referring to FIG. 7, there is illustrated a pair of sheet members 51, 52 that overlie each other. In this embodiment, a plurality of different styles of tether members, both "X" 50 and "Y" 48 is fabricated. Each sheet has a gas retention material 46 coated on the outside surfaces. Starting from one edge 62, a bonding 64 is formed to hold both sheets 51, 52 together. At a predetermined distance from this bonding 64, a cut-line 66A is formed on the outside of the sheets 51, 52. Next, another bonding 64B is made a second predetermined distance from the first cut-line 66A. This distance is then replicated on the material downstream from bonding and another cut-line 66B is formed. As we proceed downstream on the material, changing the widths of the boding and the distance from the bonding to the cut-lines can form different styles. Next the sheets 51, 52 are cut along the cut-lines 66A, 66B forming strips 53 of tether members 48, 50. As illustrated in FIG. 9 if the bonding 64 is wide, this will provide large spaces between the cylindrical tubes 30 which is also usable in the fabrication of aircraft slides.

FIG. 2 illustrates a sectional view of the cushion 16 having the tethers 48, 50 formed by sewing 68 the tether material together and bonding the arms of the tethers to the outside surface 54 of the material 44. FIG. 3 illustrates the cushion 16 having the tethers 48, 50 formed by bonding or welding the tether material together and bonding or welding the arms of the tethers to the outside surface 54 of the material.

Figure 10:
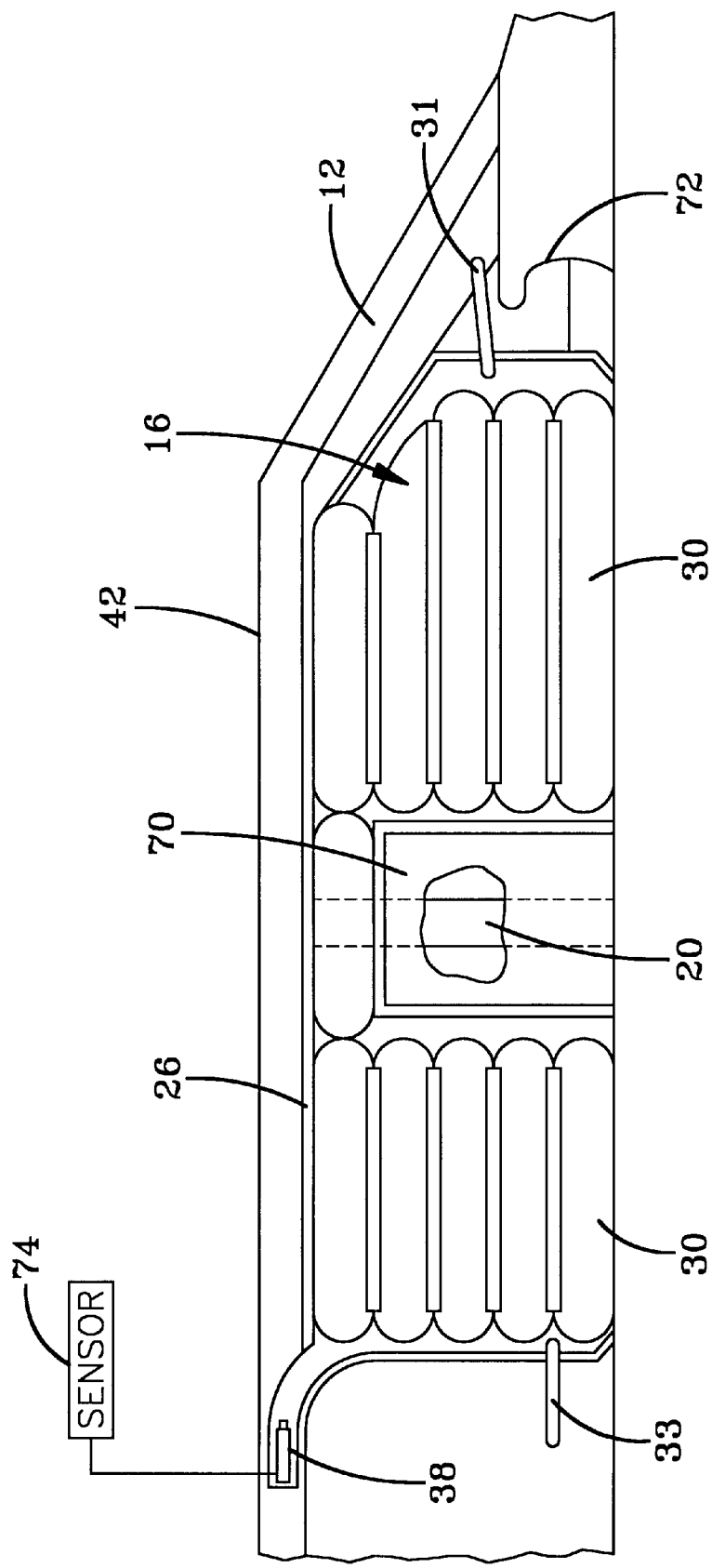
FIG. 10 is a view of the left had side of a motor vehicle from the inside having another embodiment of inflated cushion.

FIG. 10 is another embodiment of the curtain 16 wherein the cylindrical tubes 30 are parallel to the door panel 28. This is matter of design choice.

Figure 11:
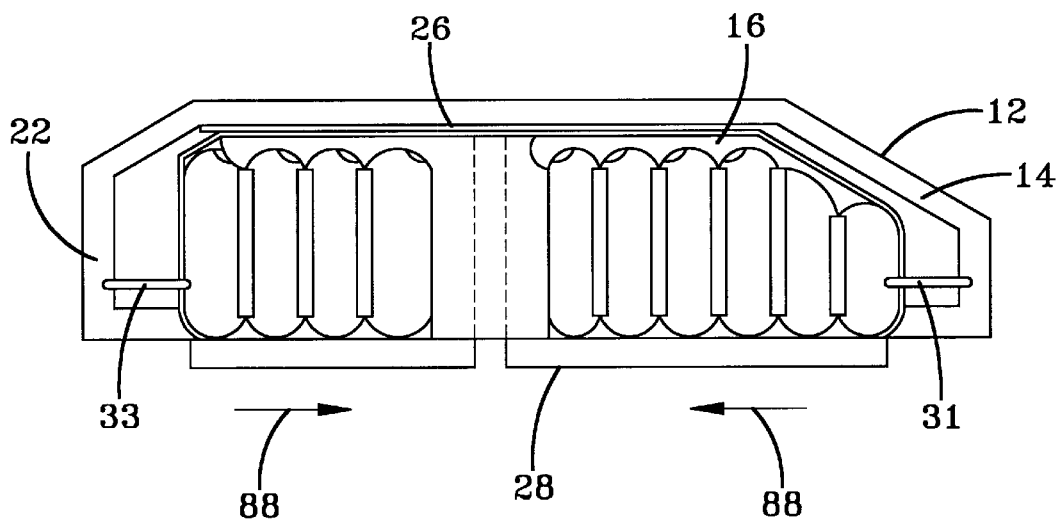
FIG. 11 is a plan view similar to FIG. 1 for the purposes of illustrating the tethers.

In FIGS. 1, 10 and 11, the curtain 16 extends from the "A" pillar 14 to the "C" pillar 22. It is obvious that such a curtain 16 can be fabricated to extend beyond the "C" 16 pillar to the next pillar or pillars. Around the "B" 20 and each pillar between the outside pillars, as far of material 44 are bonded together forming a flat member 70 to clear each pillar. In FIG. 10 depending on the design of the interior of the vehicle, a cylindrical tube 30 may be positioned along the roof rail 26.

In FIG. 1, the vertical arrangement of the cylindrical tubes 30 aids to restrict the movement of the occupant toward the instrument panel 72.

Typically, the curtain 16 is "Z" folded 76 when it is put into its stored location behind the headliner 39. This is illustrated in FIG. 12, that is a sectional view from the roof, through the roof rail 26 and down along the glass 23 on the door 18. The curtain is folded either by a "Z" fold 76 as illustrated in FIG. 12 or by a tuck-fold 78 as illustrated in FIG. 13. The curtain 16 is fastened by means of a fastener 80 through a reinforced curtain-mounting flap 82 to the structure 86 of the vehicle.

Both folds, and any other folds used that are not a "Z" fold 76 or a tuck-fold 78, have a similar characteristic in that the last fold 84 is facing downward toward the door 18. In the "Z" fold, the last fold 84, the outermost fold, is facing in the down position to ensure the proper downward and outward deployment. In the tuck-fold 78, the last fold 84 is in the middle and it too is facing downward and outward to be directed along the glass 23 of the door 18.

The curtain tethers 31, 33 have one end attached to the last folded panel 84 and the other end is positioned down along the outside pillars, located on the adjacent the ends of the inflated curtain 16. As the inflation fluid fills the tubes 30, the "Z" fold causes the bottom edge to deploy down the glass 23 of the doors 18, 24, pulling the rest of the curtain. As the bottom edge moves downward, the curtain tethers 31, 33 are pulled from behind the covering of the pillars. As the tubes 30 fill with gas, covering of the pillars. As the tubes 30 fill with gas, the vertical curtain edges pull away from the pillars, in the direction of the arrows 88 in FIG. 11, and the curtain tethers 31, 33 begin to pull taut. As the tubes fill with gas, they expand and circumference of the tubes causes the length of the curtain, in the direction 88 of front to back, to shorten. The curtain tethers 31, 33 pull from the behind the covering of the pillars 14, 22 and remain taut keeping the curtain 16 in place.

There has thus been illustrated and explained an inflatable rollover curtain or cushion 16 for motor vehicles 10. The curtain or cushion 16 is deployed according a predetermined amount, typically in degrees from the normal vertical axis of the vehicle 10, of rollover or yaw as sensed by a crash sensor 74 in the vehicle. The crash sensor 74 senses a crash or a rollover of the vehicle and generates an activation signal. The activation signal activates the gas generator 38 to inflate and deploy the curtain 16 to protect the vehicle's occupants from extending out of or leaving the vehicle.

In addition, there is described a method to manufacture the curtain or cushion 16 and the "X" 50 and "Y" 48 shaped tethers. The materials of the cushion or curtain 16 and the tether members 48, 50 inside the cushion or curtain are described.

What is claimed is:

1. An inflatable rollover cushion for motor vehicles comprising:
   a bag member formed from a single piece of material folded over and adapted to be sealed along the mating open edges forming an enclosed member;
   "Y" shaped tether members having displaced upper arms joined together along a trunk, said tether members joining said bag edges along all sides, wherein one open edge lies along the upper arm of the "Y" and along one side of the trunk and the other open edge lies along the other upper arm of the "Y" and along the other side of the trunk;
   a bonding to secure the mating open edges along the "Y" shaped tether member forming an enclosed cylindrical member; and
   an inlet at one end of said bag member adapted to receive inflation fluid for inflating said bag member.

2. An inflatable rollover cushion according to claim 1 wherein said bag member has one surface coated with a gas retention material.

3. An inflatable rollover cushion according to claim 2 wherein said coated surface is the inside surface of said folded bag member.

4. An inflatable rollover cushion according to claim 2 wherein said coated gas retention material is a thermoplastic material compatible with radio frequency welding.

5. An inflatable rollover cushion according to claim 2 wherein said coated gas retention material is a thermoplastic material compatible with ultrasonic welding.

6. An inflatable rollover cushion according to claim 1 wherein said bonding is a threaded bond.

7. An inflatable rollover cushion according to claim 1 wherein said bag member is formed from a cloth having a denier not greater than 420.

8. An inflatable rollover cushion according to claim 7 wherein said bag member is formed from a cloth having a denier not greater than 210.

9. An inflatable rollover cushion according to claim 1 wherein each of said "Y" shaped tether members comprises:
   a pair of sheet members overlying each other and having the outside surface of each of said sheet members coated with a gas retention material, said sheet members having at least one edge of the first sheet overlying an edge of the second sheet;
   a first bonding along one edge of said pair of sheet members securing both of said sheet members together; and
   a cut line on at least one of said sheet members spaced from and downstream of said first bonding forming said "Y" shaped tether members between said cut line and said first bonding.

10. An inflatable rollover cushion according to claim 9 wherein said first bonding is a threaded bond.

11. An inflatable rollover cushion according to claim 9 wherein said "Y" shaped tether members are formed from a cloth having a denier not greater than 420.

12. An inflatable rollover cushion according to claim 11 wherein said "Y" shaped tether members are formed from a cloth having a denier not greater than 210.

13. An inflatable rollover cushion according to claim 1 additionally including one or more "X" shaped tether members spaced from and parallel to said "Y" shaped tether member forming two or more elongated cylinder members.

14. An inflatable rollover cushion according to claim 13 wherein said "X" shaped tether members comprise:
  a pair of sheet members overlying each other and having the outside surface of each of said sheet members coated with a gas retention material, said sheet members having at least one edge of the first sheet overlying an edge of the second sheet;
  at least one bonding parallel to and spaced from said overlying edges forming said "X" shaped tether members between said bonding and said edges on either side of said bonding.

15. An inflatable rollover cushion according to claim 14 wherein said bonding is a threaded bond.

16. An inflatable rollover cushion according to claim 14 wherein said "X" shaped tether member is formed from a cloth having a denier not greater than 420.

17. An inflatable rollover cushion according to claim 16 wherein said "X" shaped tether member is formed from a cloth having a denier not greater than 210.

18. An inflatable rollover cushion according to claim 11 additionally including a gas generator connected to said inlet and operable to generate inflation gas of sufficient pressure to inflate said bag member.

19. An inflatable rollover cushion for motor vehicles according to claim 18 additionally including a crash sensor for sensing a crash or a rollover of the vehicle for generating an activation signal for operating said gas generator for inflating said bag member.

20. An inflatable rollover cushion for motor vehicles according to claim 19 wherein said generated gas is at a pressure in said bag member is less than 25 psig.

21. An inflatable rollover cushion for motor vehicles according to claim 20 wherein said gas generator inflates said bag member in less than 25 milliseconds.

22. An inflatable rollover cushion according to claim 1 additionally including a gas generator connected to said opening and operable to generate inflation gas of sufficient pressure to inflate said bag member.

23. An inflatable rollover cushion for motor vehicles according to claim 22 additionally including a crash sensor for sensing a crash or a rollover of the vehicle for generating an activation signal for operating said gas generator for inflating said bag member.

24. An inflatable rollover cushion for motor vehicles according to claim 23 wherein said generated gas is at a pressure in said bag member is less than 25 psig.

25. An inflatable rollover cushion for motor vehicles according to claim 24 wherein said gas generator inflates said bag member in less than 25 milliseconds.

26. An inflatable rollover cushion for motor vehicles according to claim 1 wherein said motor vehicle has a roof rail extending at least from an A-pillar to a B-pillar, a door panel between said pillars having a window;
  said bag member being folded along said roof rail inside the vehicle; and
  said inflation fluid causes said bag member to unfold and extend over the side of vehicle extending from said roof rail between said A-pillar to said B-pillar and over a portion of said door panel providing a cushion keeping an occupant from striking said area between the inflated bag member and the vehicle; and
  a first curtain tether attached at one end to said bag member and at the other end to the A-pillar and a second curtain tether attached at one end to said bag member displaced from said first curtain tether and the other end to the B-pillar.

27. An inflatable rollover cushion for motor vehicles according to claim 1 wherein said motor vehicle has a roof rail extending at least from an A-pillar to a D-pillar, a window panel between said pillars having a window;
  said bag member being folded along said roof rail inside the vehicle;
  said inflation fluid causes said bag member to unfold and extend over the side of vehicle extending from said roof rail between said A-pillar to said D-pillar and over a portion of said window providing a cushion keeping an occupant from striking said area between the inflated bag member and the vehicle; and
  a first curtain tether attached at one end to said bag member and at the other end to the A-pillar and a second curtain tether attached at one end to said bag member displaced from said first curtain tether and the other end to the D-pillar.

28. An inflatable rollover cushion for motor vehicles according to claim 1 wherein said bag member is folded in a "Z" fold having one end extending in a direction along the door of the vehicle: and
  a fastener securing the other end of the bag member to the structure of the vehicle.

29. An inflatable rollover cushion for motor vehicles according to claim 1 wherein said bag member is folded in a tuck fold having one end extending in a direction along the door of the vehicle: and
  a fastener securing the other end of the bag member to the structure of the vehicle.

30. A method for forming an inflatable rollover cushion for a motor vehicle comprising the steps of:
  securing a first sheet of material;
  coating one surface of the material with a gas retention material;
  folding the material in a manner so that the coated surfaces are adjacent to each other;
  bonding said folded material together along spaced-apart rows parallel to the folded caused by the step of folding the material to form an elongated tubular shape;
  cutting said folded material intermediate the bondings forming different shape tethers;
  securing a second sheet of material;
  coating one surface of the second sheet of material with a gas retention material;
  folding the second sheet of material in a manner so that the coated surfaces are adjacent to each other thereby having one perimeter edge being a formed from the folded material and another perimeter edge being the edges of the material overlying each other;
  locating one or more tethers of a first shape along the inside of the one perimeter edge, along the another perimeter edge, and along the inside surface of the second sheet;
  locating one or more tethers of a second shape in a spaced-apart relationship intermediate the first shaped tether and the edges of the material forming the another perimeter edge; and then
  bonding the tethers to the inside surface of the second sheet of material forming elongated tubes between the tethers.

31. The method according to claim 30 wherein said bonding is a threaded bond.

32. The method according to claim 30 wherein the step of securing the first sheet of material selects a woven material.

33. The method according to claim 30 wherein the step of securing the first sheet of material selects a material having a denier less than 420.

34. The method according to claim 33 wherein the step of securing the first sheet of material selects a material having a denier less than 210.

35. The method according to claim 30 wherein the step of securing the second sheet of material selects a woven material.

36. The method according to claim 30 wherein the step of securing the second sheet of material selects a material having a denier less than 420.

37. The method according to claim 36 wherein the step of securing the second sheet of material selects a material having a denier less than 210.

38. The method according to claim 30 wherein the steps of locating tethers locates tether members formed from a cloth having a denier not greater than 420.

39. The method according to claim 38 wherein the steps of locating tethers locates tether members formed from a cloth having a denier not greater than 210.

40. The method according to claim 30 wherein the step of securing a first sheet of material secures a pair of sheets of material each sheet;

wherein the step of coating is by coating one side of each sheet with a gas retention material; and said step of folding the first sheet of material is by placing the coated sides of each sheet so that the coated sides overlap and are adjacent to each other.

41. The method according to claim 30 wherein the step of securing the second sheet of material selects a pair of sheets of said second material each sheet having one side coated with a gas retention material; and said step of folding the second sheets of material is by placing the uncoated sides overlapping each other.

42. The method according to claim 30 wherein the step locating a tether of said first shape locates a "Y" shaped tether.

43. The method according to claim 30 wherein the step of locating a tether of said second shape locates an "X" shaped tether.

44. The method according to claim 30 wherein the step of bonding is by radio frequency bonding.

45. The method according to claim 30 wherein the step of bonding is by ultrasonic welding.

46. The method according to claim 30 wherein the step of bonding is sewing.

47. The method according to claim 30 additionally including the steps of securing a first curtain tether to the second sheet of material and securing a second curtain tether to the second sheet of material displaced from the first curtain tether.

* * * * *